United States Patent Office 3,249,623
Patented May 3, 1966

3,249,623
DERIVATIVES OF 3,4,5,6-TETRAHYDRO-1H-
AZEPINO[4,3,2-cd]INDOLES
Jackson B. Hester, Jr., Portage, Mich., assignor to The
Upjohn Company, Kalamazoo, Mich., a corporation of
Delaware
No Drawing. Filed Sept. 24, 1964, Ser. No. 399,069
6 Claims. (Cl. 260—319)

The present invention is directed to novel compounds and is more particularly concerned with novel 1-(3-dialkylaminopropyl)-3,4,5,6 - tetrahydro-1H-azepino[4,3,2-cd]indoles and acid addition salts thereof.

The novel 1-(3-dialkylaminopropyl)-3,4,5,6-tetrahydro-1H-azepino[4,3,2-cd]indoles of the present invention can be represented by the formula:

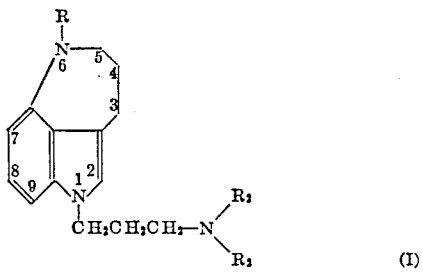

(I)

wherein $R_2$ represents methyl or ethyl, R represents hydrogen,

and

and $R_1$ represents hydrogen or alkyl of one to three carbon atoms, inclusive, i.e., methyl, ethyl, propyl, and isopropyl.

The novel 1-(3-dialkylaminopropyl)-3,4,5,6-tetrahydro-1H-azepino[4,3,2-cd]indoles of the present invention can be prepared by the following sequence of steps:

(A) Reacting 4-nitrogramine with dialkyl malonate to produce a dialkyl (4-nitroindol-3-ylmethyl)malonate having the formula:

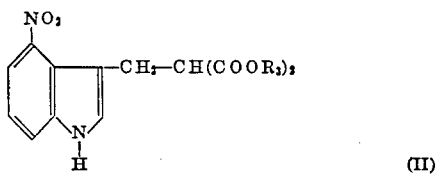

(II)

wherein $R_3$ is alkyl of one to four carbon atoms, inclusive.

The reaction is carried out in the presence of a basic condensation catalyst and an inert solvent at reaction temperatures of between about 80 and about 150° C. Inert solvents which can be employed include benzene, toluene, xylene, and the like, with benzene being preferred. Basic condensation catalysts which can be employed include sodium hydroxide, potassium hydroxide, or sodium. The sodium salt of the dialkyl malonate utilized in the reaction can also be employed as the basic condensation catalyst.

(B) Concomitantly reducing and cyclizing II using hydrogen and a hydrogenation catalyst in the presence of an inert solvent to produce a novel 5-oxo-3,4,5,6-tetrahydro-1H-azepino[4,3,2-cd]indole-4-carboxylic acid alkyl ester of the formula:

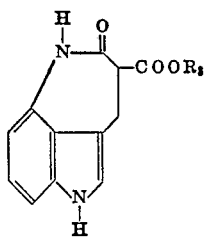

(III)

wherein $R_3$ has the above value.

The concomitant reduction and cyclization is carried out in the presence of a noble metal catalyst, e.g., platinum and palladium, or base metal catalyst, e.g., Raney nickel. For this reaction, palladium catalysts, e.g., palladium black, palladium-barium sulfate, palladium-charcoal, and the like, are generally preferred. Inert solvents suitable for the reaction include, e.g., ethyl acetate, methanol, ethanol, isopropyl alcohol, and the like. In the reaction, hydrogen pressures can range from slightly under atmospheric to about five atmospheres although higher pressures can also be used.

(C) Saponifying III in conventional manner (e.g., with sodium hydroxide, potassium hydroxide or lithium hydroxide in the presence of aqueous methanol, aqueous ethanol or aqueous propanol) to produce an alkali metal salt of the novel 5-oxo-3,4,5,6-tetrahydro-1H-azepino[4,3,2-cd]indole-4-carboxylic acid of the formula:

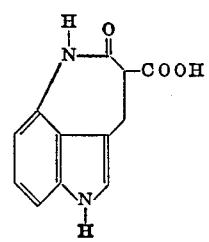

(IV)

followed by acidification of the reaction mixture, e.g., with hydrochloric acid, hydrobromic acid or sulfuric acid to obtain the free acid IV.

(D) Heating the compound of Formula IV, preferably under reduced pressure, at between about 155 and about 200° C., preferably about 170° C., to produce 5-oxo-3,4,5,6-tetrahydro - 1H - azepino[4,3,2 - cd]indole of the formula:

(V)

(E) Reducing the compound of Formula V with a reducing agent, e.g., lithium aluminum hydride, lithium borohydride, and the like, with lithium aluminum hydride being preferred, to produce 3,4,5,6-tetrahydro-1H-azepino[4,3,2-cd]indole having the formula:

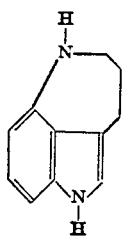

(VI)

The reduction is preferably carried out with an excess of lithium aluminum hydride in a refluxing solvent, preferably tetrahydrofuran. Other inert solvents which can be employed include diethyl ether, diisopropyl ether, N-methylmorpholine, dioxane, and the like. The reduction is carried out between about zero and about 100° C., preferably between about zero and about 65° C. when lithium aluminum hydride is employed.

(F) Reacting the compound of Formula VI with a 3-dialkylaminopropyl halide,

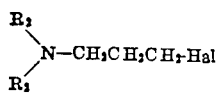

wherein $R_2$ has the above value and "Hal" is halogen, preferably chlorine or bromine, to produce a 1-(3-dialkylaminopropyl) - 3,4,5,6 - tetrahydro-1H-azepino[4,3,2-cd]indole of the formula:

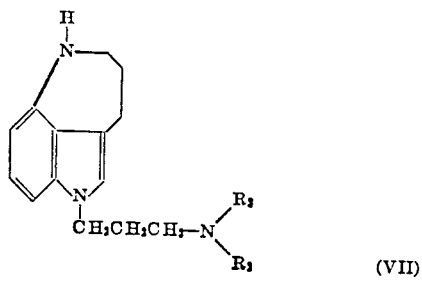

(VII)

wherein $R_2$ has the above value.

The reaction is preferably carried out at between about 20 and about 50° C., in the presence of an inert solvent, e.g., liquid ammonia, dimethylformamide, and the like, and an alkaline condensing agent, e.g., an alkali-metal amide or alkali-metal hydride such as sodium amide, lithium amide, potassium amide, sodium hydride, and lithium hydride.

(G) Reacting VII with an alkanoic anhydride, e.g., formic acetic anhydride, acetic anhydride, propionic anhydride, isobutyric anhydride, and the like, or with an alkanoyl halide, e.g., acetyl chloride, acetyl bromide, propionyl chloride, butyryl chloride, and the like, to produce a 6-alkanoyl-1-(3-dialkylaminopropyl)-3,4,5,6-tetrahydro-1H-azepino[4,3,2-cd]indole having the formula:

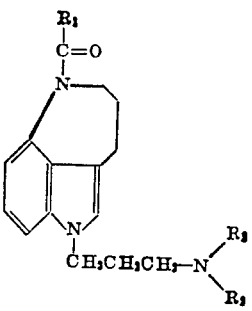

(VIII)

wherein $R_1$ and $R_2$ have the values represented above.

(H) Reducing VIII with a reducing agent, e.g., lithium aluminum hydride, lithium borohydride, and the like, with lithium aluminum hydride being preferred, under the reaction conditions set forth above for the reduction of the compound of Formula V, to produce a 6-alkyl-1-(3-dialkylaminopropyl) - 3,4,5,6 - tetrahydro-1H-azepino[4,3,2-cd]indole having the formula:

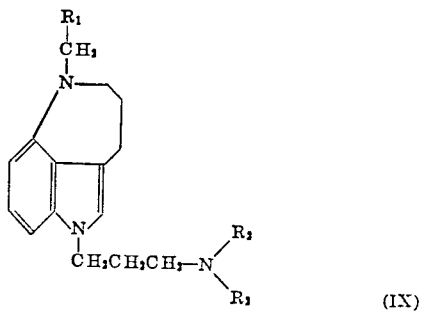

(IX)

wherein $R_1$ and $R_2$ have the above values.

The novel compounds of Formulae VII and IX have been found to possess valuable pharmacological activity in animals and mammals. Illustratively, these compounds exhibit anti-inflammatory activity. When used in therapy, these novel compounds can be combined with solid or liquid pharmaceutical carriers and formulated in the form of tablets, powder packets or capsules, using starch and like excipients, or dissolved or suspended in suitable solvents or vehicles, for oral or parenteral administration.

Novel mono- or diacid addition salts of the present invention can be prepared by reacting a compound of Formulae VII, VIII or IX with a stoichiometric quantity of an acid, e.g., hydrochloric, hydrobromic, sulfuric, acetic, tartaric, citric, or the like. In view of the presence of two basic groups in the compounds of Formulae VII and IX, either mono- or diacid addition salts can be prepared, whereas only monoacid addition salts of the monoamines VIII can be produced. The acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel compounds of Formulae VII, VIII and IX can be reacted with fluosilicic acid to form amine fluosilicate salts useful as mothproofing agents according to U.S. Patents 1,915,334 and 2,075,359. These amines also form salts with thiocyanic acid, which salts can be condensed with formaldehyde according to U.S. Patents 2,425,320 and 2,606,155 to form amine thiocyanate-formaldehyde condensation products useful as pickling inhibitors.

The following examples are illustrative of the process and products of the present invention, but are not to be construed as limiting.

EXAMPLE 1.—6 - ETHYL - 1-(3-DIMETHYLAMINOPROPYL) - 3,4,5,6 - TETRAHYDRO - 1H-AZEPINO[4,3,2-cd]INDOLE

*A. Diethyl (4-nitroindol-3-ylmethyl)malonate*

A vigorous stream of nitrogen was bubbled through a refluxing mixture of 100 g. (0.457 mole) of 4-nitrogramine (Berti et al., Gazz. Chim. Ital. 90, 525, 1960), 72 ml. (0.474 mole) of diethyl malonate, 4 l. of dry benzene, and 5 g. of powdered sodium hydroxide for 11.3 hours. The resulting dark mixture was allowed to stand for 18 hours at about 25° C. and was then filtered. The solid was washed with ether and the combined filtrate and washings were concentrated to dryness under reduced pressure. A solution of the residue in ethyl acetate was crystallized to yield two crops of diethyl (4-nitroindol-3-ylmethyl)

malonate which totaled 98.45 g. and melted between 109–111.5° C. An analytical sample prepared by recrystallizing from a mixture of ethyl acetate and Skellysolve B (mixed hexanes) melted between 109–111° C.

*Analysis.*—Calcd. for $C_{16}H_{18}N_2O_6$: C, 57.48; H, 5.43; N, 8.38. Found: C, 57.61; H, 5.38; N, 8.20.

In the same manner as shown above, dimethyl (4-nitroindol-3-ylmethyl)malonate, dipropyl (4-nitroindol-3-ylmethyl)malonate, and dibutyl (4-nitroindol-3-ylmethyl)malonate are prepared by substituting dimethyl malonate, dipropyl malonate, and dibutyl malonate, respectively, for diethyl malonate.

B. 4-carbethoxy-5-oxo-3,4,5,6-tetrahydro-1H-azepino[4,3,2-cd]indole

A mixture of the diethyl ester of Part A (10 g.; 29.9 mmoles), 10% palladium-on-charcoal catalyst (2 g.), and 95% ethanol (300 ml.) was hydrogenated in a Parr apparatus at an initial hydrogen pressure of 46 p.s.i. After about 30 minutes, the reduction was complete and the catalyst was removed by filtration through diatomaceous earth. The combined filtrate from five identical runs was concentrated under reduced pressure. Chromatography of the residue on four pounds of neutral alumina with 50% ether-chloroform and 100% chloroform yielded a crystalline product which was recrystallized from ethanol to yield 15.83 g. (41%) of 4-carbethoxy-5-oxo-3,4,5,6 - tetrahydro - 1H - azepino[4,3,2 - cd]indole which melted between 211–213.5° C. A sample was recrystallized three times from methanol and melted between 211.5–213.5° C.

*Analysis.*—Calcd. for $C_{14}H_{14}N_2O_3$: C, 65.10; H, 5.46; N, 10.85. Found: C, 65.22; H, 5.75; N, 10.83.

C. 5-oxo-3,4,5,6-tetrahydro-1H-azepino[4,3,2-cd]indole-4-carboxylic acid

A mixture of the ester of Part B (16.74 g.; 64.9 mmoles), 0.433 N aqueous potassium hydroxide (150 ml.; 65 mmoles), and ethanol (850 ml.) was refluxed under nitrogen for 6 hours, allowed to stand for 18 hours at 25° C., and then concentrated to dryness under reduced pressure. An aqueous solution of the residue was cooled in an ice bath and acidified with hydrochloric acid. The solid which precipitated was collected by filtration, washed with water, and dried under reduced pressure at 30° C. to yield 15.72 g. of crude 5-oxo-3,4,5,6-tetrahydro-1H-azepino[4,3,2-cd]indole-4-carboxylic acid which melted between 143–148° C. (dec.).

D. 5-oxo-3,4,5,6-tetrahydro-1H-azepino[4,3,2-cd]indole

The acid of Part C (15.72 g.) was heated in an evacuated flask at about 170° C. and 17 mm. of mercury pressure for 30 minutes. During the reaction, the solid acid slowly decarboxylated to yield a solid product. This was recrystallized from ethanol to yield 10.81 g. of 5-oxo-3,4,5,6-tetrahydro-1H-azepino[4,3,2-cd]indole which melted between 213–214° C. A sample was recrystallized three times from ethanol and melted between 214–216° C.

*Analysis.*—Calcd. for $C_{11}H_{10}N_2O$: C, 70.95; H, 5.41; N, 15.05. Found: C, 70.83; H, 5.32; N, 14.85.

E. 3,4,5,6-tetrahydro-1H-azepino[4,3,2-cd]indole

To a stirred, ice-cold suspension of 7 g. of lithium aluminum hydride in 700 ml. of dry tetrahydrofuran was added, under nitrogen, 7 g. (37.6 mmoles) of 5-oxo-3,4,5,6-tetrahydro-1H-azepino[4,3,2-cd]indole. The resulting mixture was refluxed for 6 hours, allowed to stand at 25° C. for 18 hours and then treated successively with 7 ml. of water, 7 ml. of 15% aqueous sodium hydroxide solution, and 21 ml. of water. The inorganic precipitate was collected by vacuum filtration and washed with ether. The combined filtrate and washings were concentrated to obtain a solid. The latter was recrystallized from ethyl acetate-Skellysolve B to yield 3.41 g. (52.7%) of 3,4,5,6-tetrahydro-1H-azepino[4,3,2-cd]indole which melted between 119–121.5° C. An ether solution of this compound was decolorized with activated charcoal, filtered, and cooled to cause crystallization. The solid was recrystallized from ether to obtain 3,4,5,6-tetrahydro-1H-azepino[4,3,2-cd]indole which melted between 119–120°C.

*Analysis.*—Calcd. for $C_{11}H_{12}N_2$: C, 76.71; H, 7.02; N, 16.27. Found: C, 77.11; H, 7.22; N, 16.43.

F. 1-(3-dimethylaminopropyl)-3,4,5,6-tetrahydro-1H-azepino[4,3,2-cd]indole free base and dihydrochloride To a stirred solution of 3,4,5,6-tetrahydro-1H-azepino[4,3,2-cd]indole (3.0 g.; 17.4 mmoles) in dry dimethylformamide (90 ml.), under nitrogen, was added 1.02 g. of a 53.4% suspension of sodium hydride in mineral oil (22.6 mmoles of sodium hydride). The resulting mixture was stirred at 25° C. for one hour, cooled in an ice bath, and treated during 10 minutes with 4.86 ml. of a 50% solution of 3-dimethylaminopropyl chloride in toluene (22.6 mmoles of the chloride). The mixture was then allowed to warm to 25° C. and stand for 20 hours. The reaction mixture was poured into ice water (600 ml.) and extracted several times with ether. The combined ether extracts were washed with water and saturated sodium chloride solution, dried over anhydrous magnesium sulfate, and concentrated under reduced pressure, to produce 1 - (3 - dimethylaminopropyl) - 3,4,5,6 - tetrahydro-1H-azepino[4,3,2-cd]indole free base. A solution of the free base in ether was acidified with ethereal hydrogen chloride. The resulting solid was recrystallized from methanol-Skellysolve B to yield 2.14 g. (38.9%) of 1-(3-dimethylaminopropyl) - 3,4,5,6 - tetrahydro-1H-azepino[4,3,2-cd]indole dihydrochloride. An analytical sample was prepared by recrystallizing from methanol-Skellysolve B and melted at 276° C. (dec.).

*Analysis.*—Calcd. for $C_{16}H_{23}N_3 \cdot 2HCl$: C, 58.18; H, 7.63; N, 12.72. Found: C, 57.81; H, 7.33; N, 12.30.

In the same manner as shown above, 1-(3-diethylaminopropyl) - 3,4,5,6 - tetrahydro-1H-azepino[4,3,2-cd]indole free base and dihydrochloride were prepared by substituting 3 - diethylaminopropyl chloride for 3 - dimethylaminopropyl chloride.

G. 6-acetyl-1-(3 - dimethylaminopropyl) - 3,4,5,6 - tetrahydro-1H-azepino[4,3,2-cd]indole free base and hydrochloride A suspension of the 1-(3-dimethylaminopropyl)-3,4,5,6-tetrahydro - 1H - azepino[4,3,2-cd]indole dihydrochloride (1.50 g.; 4.74 mmoles) of Part F in dilute aqueous sodium hydroxide was stirred with ether. The resulting ether solution was washed with water and saturated sodium chloride solution, dried over anhydrous magnesium sulfate, and concentrated under reduced pressure. A solution of the residue in acetic anhydride (20 ml.) was allowed to stand at 25° C. for 18 hours and was then poured into water. The aqueous solution was made alkaline with sodium hydroxide and the mixture was extracted with ether. The ether solution was washed with water and saturated sodium chloride solution, dried over anhydrous magnesium sulfate, and concentrated under reduced pressure, to produce 6-acetyl-1-(3-dimethylaminopropyl) - 3,4,5,6 - tetrahydro-1H-azepino[4,3,2-cd]indole free base. A solution of the free base in ether was acidified with ethereal hydrogen chlorine. The resulting solid was recrystallized from ethanol-ether to yield 1.49 g. of 6 - acetyl - 1 - (3 - dimethylaminopropyl)-3,4,5,6-tetrahydro-1H-azepino[4,3,2-cd]-indole hydrochloride which melted between 250–251° C.

*Analysis.*—Calcd. for $C_{18}H_{25}N_3O \cdot HCl$: C, 64.36; H, 7.80; N, 12.51; Cl, 10.56. Found: C, 64.84; H, 8.12; N, 12.62; Cl, 10.24.

In the same manner as shown above, 6-formyl-1-(3-dimethylaminopropyl) - 3,4,5,6 - tetrahydro - 1H - azepino[4,3,2-cd]indole free base and hydrochloride, 6-propionyl - 1 - (3-dimethylaminopropyl)-3,4,5,6-tetrahydro-1H-azepino[4,3,2-cd]indole free base and hydrochloride, and 6 - butyryl - 1-(3-dimethylaminopropyl)-3,4,5,6-tetrahydro-1H-azepino[4,3,2-cd]indole free base and hydrochloride were prepared by substituting formic acetic anhydride, propionic anhydride and butyric anhydride, respectively, for acetic anhydride.

H. *6-ethyl-1-(3-dimethylaminopropyl)-3,4,5,6-tetrahydro-1H-azepino[4,3,2-cd]indole diacetate*

A suspension of 6-acetyl-1-(3-dimethylaminopropyl) 3,4,5,6 - tetrahydro - 1H-azepino[4,3,2-cd]indole hydrochloride (4.0 g.; 12 mmoles) in dilute aqueous sodium hydroxide was stirred with ether. The resulting ether solution was washed with water and saturated sodium chloride solution, dried with anhydrous magnesium sulfate, and taken to dryness under reduced pressure to obtain 6 - acetyl - 1 - (3-dimethylaminopropyl)-3,4,5,6-tetrahydro - 1H - azepino[4,3,2-cd]indole free base. The latter was added to an ice-cold suspension of 2.5 g. (66 mmoles) of lithium aluminum hydride in 260 ml. of dry tetrahydrofuran. The resulting mixture was refluxed under nitrogen for 10 hours, cooled in an ice-bath, and treated successively with 2.5 ml. of water, 2.5 ml. of 15% aqueous sodium hydroxide solution, and 7.5 of water. The resulting mixture was stirred in the ice bath for about an hour. The solid was collected by filtration and washed several times with ether. Concentration of the combined filtrate and washings yielded a solid which was dissolved in ether. The solution was decolorized with activated charcoal, filtered, and cooled to cause recrystallization of 6-ethyl - 1 - (3-dimethylaminopropyl) - 3,4,5,6 - tetrahydro-1H-azepino[4,3,2-cd]indole free base. The free base was acidified with acetic acid to produce 6-ethyl-1-(3-dimethylaminopropyl) - 3,4,5,6 - tetrahydro - 1H - azepino [4,3,2-cd]indole diacetate.

In the same manner as shown above, 6-methyl-1-(3-dimethylaminopropyl) - 3,4,5,6-tetrahydro - 1H - azepino [4,3,2-cd]indole free base and dihydrochloride; 6-propyl-1-(3-dimethylaminopropyl)-3,4,5,6-tetrahydro - 1H - azepino [4,3,2-cd]indole free base and dihydrobromide; and 6-butyl - 1 - (3 - dimethylaminopropyl)-3,4,5,6-tetrahydro-1H-azepino[4,3,2-cd]indole free base and sulfate were prepared by substituting 6 - butyl-1-(3-dimethylaminopropyl)-3,4,5,6 - tetrahydro - 1H-azepino[4,3,2-cd]indole free base and sulfate were prepared by substituting 6-formyl-1-(3 - dimethylaminopropyl) - 3,4,5,6 - tetrahydro-1H-azepino-[4,3,2-cd]indole hydrochloride and hydrogen chloride; 6-propionyl-1-(3-dimethylaminopropyl) - 3,4,5,6-tetrahydro-1H-azepino[4,3,2-cd]indole hydrochloride and hydrogen bromide; and 6-butyryl-1-(3-dimethylaminopropyl)-3,4,5,6-tetrahydro-1H-azepino[4,3,2-cd]indole hydrochloride and sulfuric acid for 6-acetyl-1-(3-dimethylaminopropyl)-3,4,5,6 - tetrahydro - 1H - azepino[4,3,2-cd] indole hydrochloride and acetic acid.

EXAMPLE 2.—6 - ACETYL - 1 - (3 - DIETHYLAMINOPROPYL) - 3,4,5,6 - TETRAHYDRO - 1H-AZEPINO[4,3,2 - cd]INDOLE FREE BASE AND ACETATE

In the same manner as shown in Example 1, Part G, 6 - acetyl - 1 - (3 - diethylaminopropyl) - 3,4,5,6-tetrahydro-1H - azepino[4,3,2 - cd]indole free base and acetate were prepared by substituting 1-(3-diethylaminopropyl) - 3,4,5,6 - tetrahydro - 1H - azepino[4,3,2 - cd] indole dihydrochloride for 1-(3-dimethylaminopropyl)-3,4,5,6 - tetrahydro - 1H - azepino[4,3,2 - cd]indole dihydrochloride and acetic acid for ethereal hydrogen chloride.

Similarly, 6 - formyl - 1 - (3 - diethylaminopropyl)-3,4,5,6-tetrahydro-1H-azepino[4,3,2-cd]indole free base and acetate, 6-propionyl-1-(3-diethylaminopropyl)-3,4,5,6-tetrahydro-1H-azepino[4,3,2-cd]indole free base and acetate, and 6-butyryl-1-(3-diethylaminopropyl)-3,4,5,6-tetrahydro-1H-azepino[4,3,2-cd]indole free base and acetate were prepared by substituting 1-(3-diethylaminopropyl)-3,4,5,6-tetrahydro-1H-azepino[4,3,2-cd)indole dihydrochloride for 1 - (3-dimethylaminopropyl)-3,4,5,6- tetrahydro-1H-azepino[4,3,2 - cd]indole dihydrochloride and formic acetic anhydride, propionic anhydride, and butyric anhydride, respectively, for acetic anhydride, and acetic acid for ethereal hydrogen chloride.

EXAMPLE 3.—6 - ETHYL - 1 - (3 - DIETHYLAMINOPROPYL) - 3,4,5,6-TETRAHYDRO - 1H - AZEPINO-[4,3,2 - cd]INDOLE FREE BASE

In the same manner as shown in Example 1, Part H, 6 - ethyl - 1 - (3 - diethylaminopropyl) - 3,4,5,6 - tetrahydro-1H-azepino[4,3,2-cd]indole was prepared by reducing 6 - acetyl - 1 - (3 - diethylaminopropyl) - 3,4,5,6-tetrahydro - 1H - azepino[4,3,2 - cd]indole free base instead of 6-acetyl - 1 - (3-dimethylaminopropyl)-3,4,5,6-tetrahydro - 1H - azepino[4,3,2 - cd]indole free base.

Similarly, 6 - methyl - 1 - (3 - diethylaminopropyl)-3,4,5,6 - tetrahydro - 1H - azepino[4,3,2 - cd]indole free base, 6 - propyl - 1 - (3 - diethylaminopropyl) - 3,4,5,6-tetrahydro - 1H - azepino[4,3,2 - cd]indole free base, and 6 - butyl - 1 - (3 - diethylaminopropyl) - 3,4,5,6-tetrahydro-1H-azepino[4,3,2-cd]indole free base were prepared by substituting 6-formyl-1-(3-diethylaminopropyl) - 3,4,5,6-tetrahydro-1H-azepino[4,3,2-cd]indole free base, 6 - propionyl - 1 - (3 - diethylaminopropyl)-3,4,5,6-tetrahydro-1H-azepino[4,3,2-cd]indole free base, and 6-butyryl - 1 - (3 - diethylaminopropyl) - 3,4,5,6 - tetrahydro - 1H - azepino[4,3,2-cd]indole free base for 6-acetyl - 1 - (3 - dimethylaminopropyl) - 3,4,5,6 - tetrahydro-1H-azepino[4,3,2-cd]indole free base.

I claim:
1. A compound selected from the group consisting of (1) 1 - (3 - dialkylaminopropyl) - 3,4,5,6 - tetrahydro-1H-azepino[4,3,2-cd]indoles having the formula:

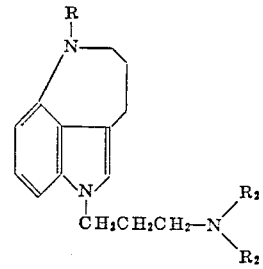

wherein R is selected from the group consisting of hydrogen,

and

wherein $R_1$ is selected from the group consisting of hydrogen and alkyl of one to three carbon atoms, inclusive, and $R_2$ is selected from the group consisting of methyl and ethyl, and (2) acid addition salts thereof.

2. A 1 - (3 - dialkylaminopropyl) - 3,4,5,6 - tetrahydro-1H-azepino[4,3,2-cd]indole having the formula:

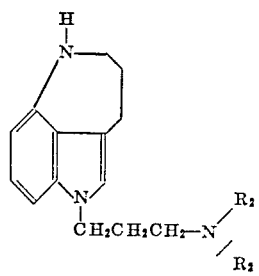

wherein $R_2$ is selected from the group consisting of methyl and ethyl.

3. A 6 - alkanoyl - 1 - (3 - dialkylaminopropyl) - 3,4,5,6 - tetrahydro-1H-azepino[4,3,2-cd]indole having the formula:

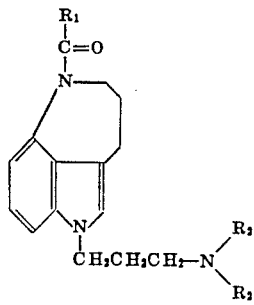

wherein $R_1$ is selected from the group consisting of hydrogen and alkyl of one to three carbon atoms, inclusive, and $R_2$ is selected from the group consisting of methyl and ethyl.

4. A 6 - alkyl - 1 - (3 - dialkylaminopropyl) - 3,4,5,6- tetrahydro-1H-azepino[4,3,2-cd]indole having the formula:

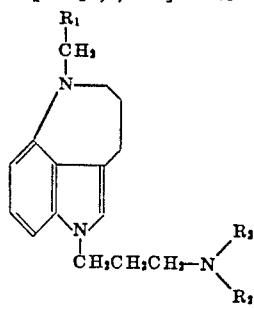

wherein $R_1$ is selected from the group consisting of hydrogen and alkyl of one to three carbon atoms, inclusive, and $R_2$ is selected from the group consisting of methyl and ethyl.

5. 1 - (3 - dimethylaminopropyl) - 3,4,5,6 - tetrahydro-1H-azepino[4,3,2-cd]indole dihydrochloride.

6. 6 - acetyl - 1 - (3 - dimethylaminopropyl) - 3,4,5,6-tetrahydro-1H-azepino[4,3,2-cd]indole hydrochloride.

No references cited.

HENRY R. JILES, *Acting Primary Examiner.*

MARY O'BRIEN, *Assistant Examiner.*